(12) United States Patent
Hu et al.

(10) Patent No.: US 11,516,867 B2
(45) Date of Patent: Nov. 29, 2022

(54) SINGLE TRANSMITTER DUAL CONNECTIVITY CELLULAR COMMUNICATION

(71) Applicant: Apple Inc., Cupertino, CA (US)

(72) Inventors: Haijing Hu, Los Gatos, CA (US); Dawei Zhang, Saratoga, CA (US); Fangli Xu, Beijing (CN); Haitong Sun, Cupertino, CA (US); Wei Zeng, Saratoga, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 16/960,291

(22) PCT Filed: Jan. 30, 2018

(86) PCT No.: PCT/CN2018/074576
§ 371 (c)(1),
(2) Date: Jul. 6, 2020

(87) PCT Pub. No.: WO2019/148321
PCT Pub. Date: Aug. 8, 2019

(65) Prior Publication Data
US 2020/0344832 A1 Oct. 29, 2020

(51) Int. Cl.
*H04W 76/16* (2018.01)
*H04W 72/04* (2009.01)
*H04W 88/06* (2009.01)

(52) U.S. Cl.
CPC ......... *H04W 76/16* (2018.02); *H04W 72/048* (2013.01); *H04W 72/0413* (2013.01); *H04W 72/0453* (2013.01); *H04W 88/06* (2013.01)

(58) Field of Classification Search
CPC ............. H04W 76/16; H04W 72/0413; H04W 72/0453; H04W 72/048; H04W 88/06; H04W 24/10; H04W 8/24; H04W 76/27
See application file for complete search history.

(56) References Cited

U.S. PATENT DOCUMENTS 10,470,069 B2 * 11/2019 Wu .................. H04L 41/0816
10,541,768 B2 *  1/2020 Su ..................... H04W 76/16
(Continued)

FOREIGN PATENT DOCUMENTS

| CN | 107046697 A | 8/2017 |
| CN | 107155181 A | 12/2017 |

(Continued)

OTHER PUBLICATIONS

Extended European Search Report for EP 18903352.5, Aug. 30, 2021, 12 pages.

(Continued)

*Primary Examiner* — Brian T O Connor
(74) *Attorney, Agent, or Firm* — Kowert, Hood, Munyon, Rankin & Goetzel, P.C.

(57) ABSTRACT

Apparatuses, systems, and methods for a wireless device to perform single transmitter dual connectivity cellular communication. The wireless device may establish a radio resource control connection with a base station. The wireless device may provide an indication of radio frequency capability information for the wireless device to the base station. Providing the radio frequency capability information for the wireless device may affect whether and how the wireless device is configured for dual connectivity cellular communication.

20 Claims, 18 Drawing Sheets

(56) References Cited

U.S. PATENT DOCUMENTS

| | | | | |
|---|---|---|---|---|
| 10,660,098 B2 * | 5/2020 | Lim | .................... | H04B 17/345 |
| 10,785,824 B2 * | 9/2020 | Liu | ........................ | H04L 69/22 |
| 10,880,940 B2 * | 12/2020 | Wang | .................... | H04W 76/12 |
| 11,265,967 B2 * | 3/2022 | Takahashi | ............. | H04W 76/15 |
| 11,387,968 B2 * | 7/2022 | Lim | .................... | H04W 76/15 |
| 11,412,423 B2 * | 8/2022 | Teyeb | .................. | H04W 76/30 |
| 2017/0238292 A1 | 8/2017 | Rico Alvarino et al. | | |
| 2018/0343697 A1 * | 11/2018 | Hsu | ....................... | H04W 76/16 |
| 2019/0098489 A1 * | 3/2019 | Shi | ................... | H04W 72/0453 |
| 2019/0200406 A1 * | 6/2019 | Henttonen | ........ | H04W 28/0268 |
| 2020/0154498 A1 * | 5/2020 | Wang | .................... | H04W 76/12 |
| 2020/0221290 A1 * | 7/2020 | Wiemann | .......... | H04W 72/0453 |
| 2020/0229180 A1 * | 7/2020 | Liu | ....................... | H04L 5/0051 |

FOREIGN PATENT DOCUMENTS

| | | | |
|---|---|---|---|
| WO | 2018016853 A1 | 1/2018 | |
| WO | 2019098928 A1 | 5/2019 | |

OTHER PUBLICATIONS

Apple "UE capability indication for single UL transmission of LTE-NR DC"; 3GPP TSG-RAN WG2 #99 R2-1709700; Berlin, Germany; Aug. 21-25, 2017; 4 pages.

International Search Report, PCT/CN/2018/074576, dated Sep. 29, 2018; 8 pages.

* cited by examiner

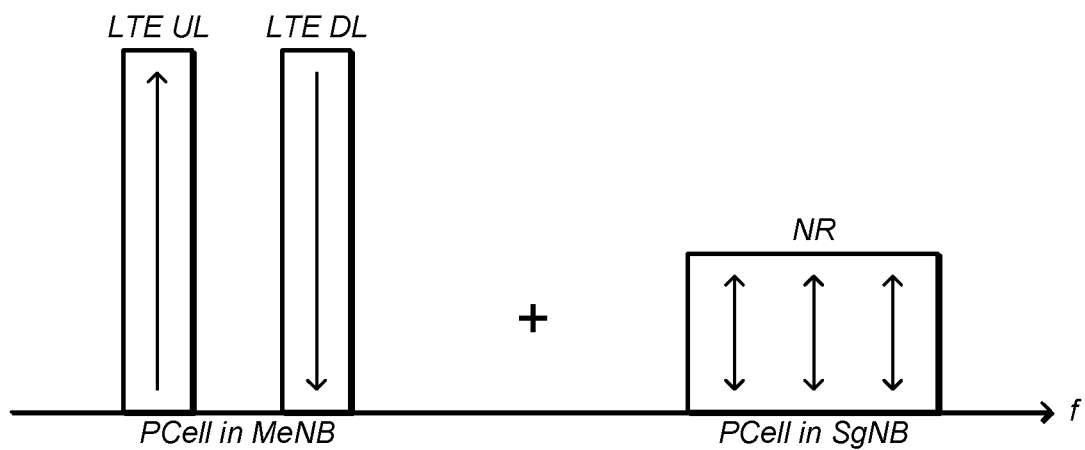
FIG. 9

SINGLE TRANSMITTER DUAL CONNECTIVITY CELLULAR COMMUNICATION

PRIORITY CLAIM

This application is a national phase entry of PCT application number PCT/CN2018/074576, entitled "Single Transmitter Dual Connectivity Cellular Communication," filed Jan. 30, 2018, which is hereby incorporated by reference in its entirety as though fully and completely set forth herein.

FIELD

The present application relates to wireless devices, and more particularly to apparatus, systems, and methods for a wireless device to perform single transmitter dual connectivity cellular communication.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to perform single transmitter dual connectivity cellular communication.

According to the techniques described herein, a framework may be provided for a wireless device to indicate information regarding its radio frequency capabilities to a cellular network from which the wireless device is obtaining service. For example, such a framework may allow the wireless device to indicate if the wireless device is limited to a single uplink transmit chain for communicating with the cellular network.

By providing a mechanism for a wireless device to indicate such information regarding its radio frequency capabilities, the network may be able to reliably accommodate devices with certain limitations to their radio frequency capabilities, such as having a single uplink transmit chain available for communicating with the cellular network.

For example, in a non-standalone deployment of 5G NR alongside LTE, when determining whether and how to configure a wireless device for NR and LTE dual connectivity, a network may consider the indicated radio frequency capabilities of the wireless device. Thus, the network may be able to provide a dual connectivity configuration that can be supported using a single uplink transmit chain if a wireless device indicates that it has a single uplink transmit chain available for communicating with the cellular network.

Such a framework may provide for the possibility that simpler and/or more cost-efficient wireless devices are able to utilize dual connectivity cellular communication techniques, at least according to some embodiments. This may expand the possible range of wireless devices that can utilize dual connectivity communication techniques and/or may quicken the possible pace of adoption for 5G NR communication techniques, e.g., which may at least initially be deployed in such non-standalone arrangements.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9 illustrates an example of a possible dual connectivity resource utilization scheme, according to some embodiments;

Figure 1:
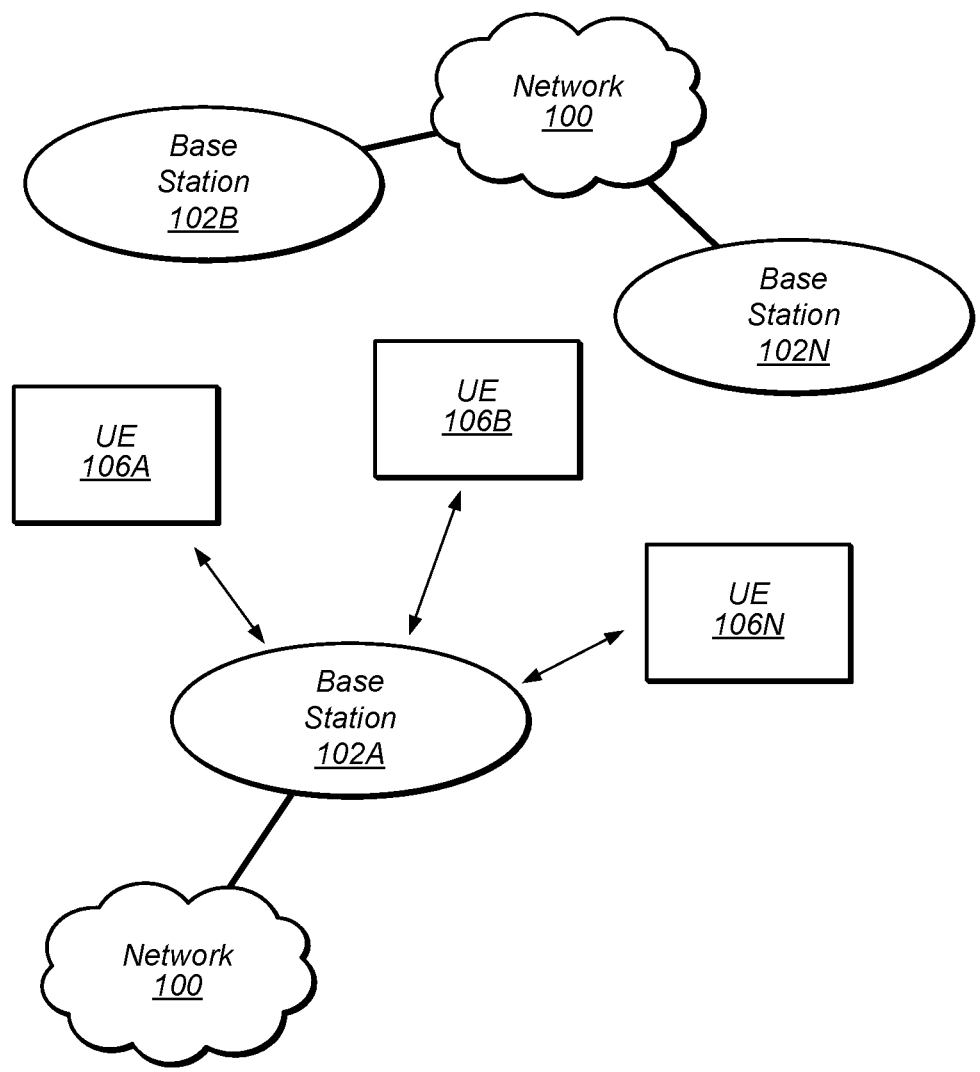
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
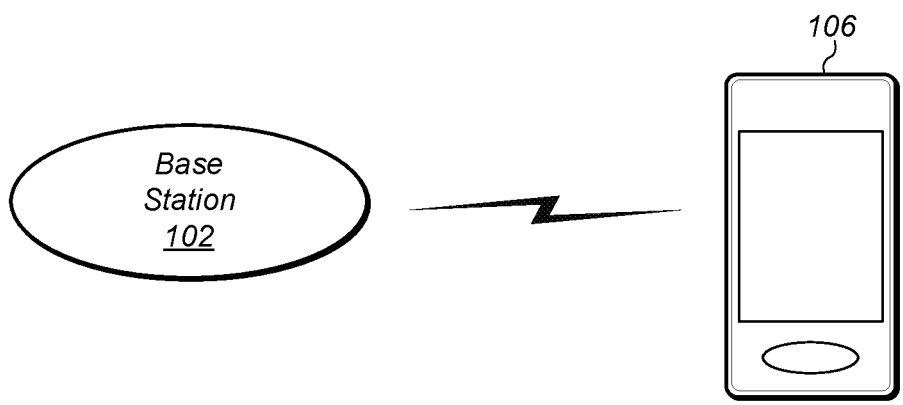
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
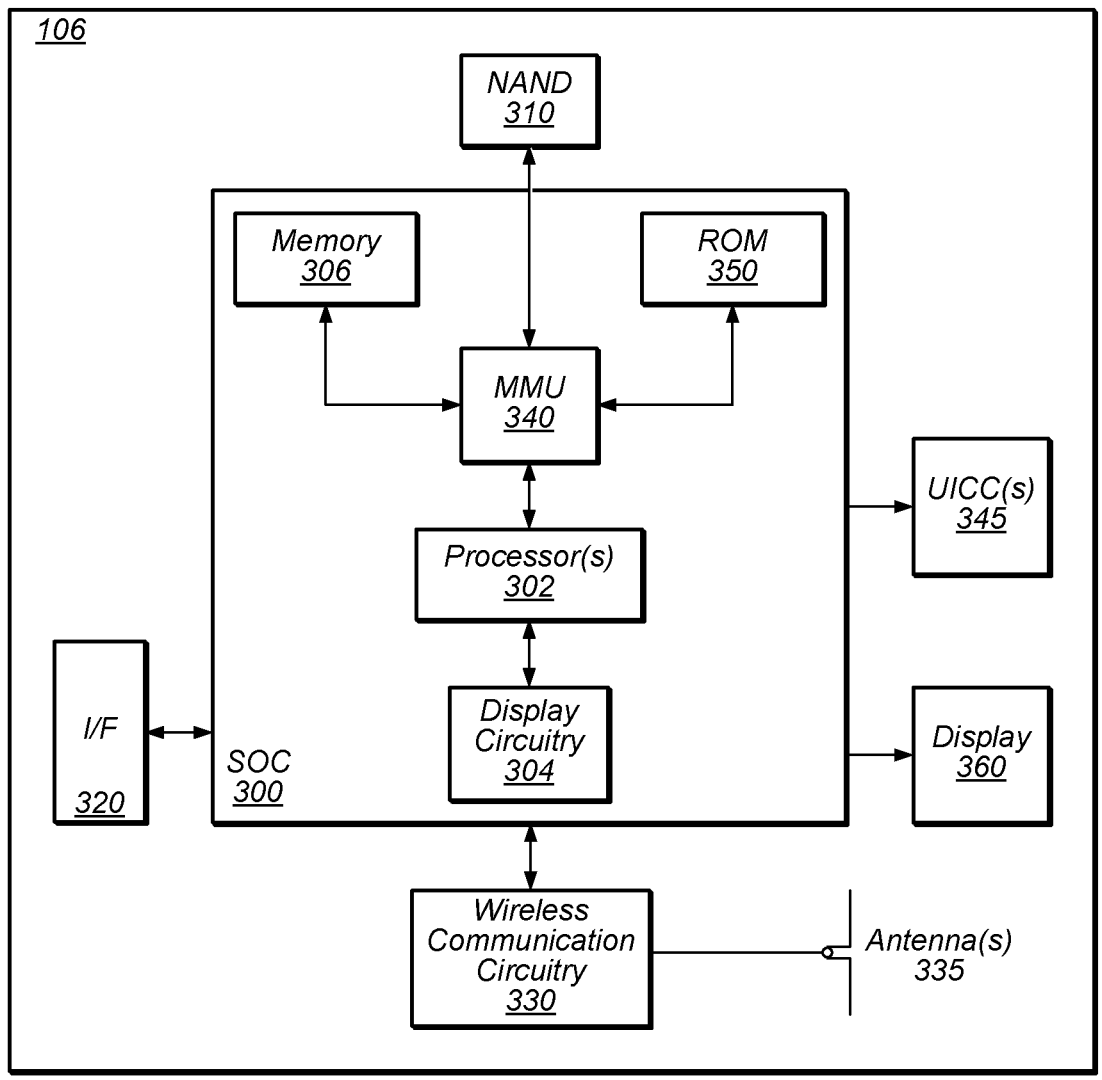
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing features for performing single transmitter dual connectivity cellular communication, as well as the various other techniques described herein. The processor 302 of the communication device 106 may be configured to implement part or all of the features described herein, e.g., by executing program instructions stored on a memory medium (e.g., a non-transitory computer-readable memory medium).

Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
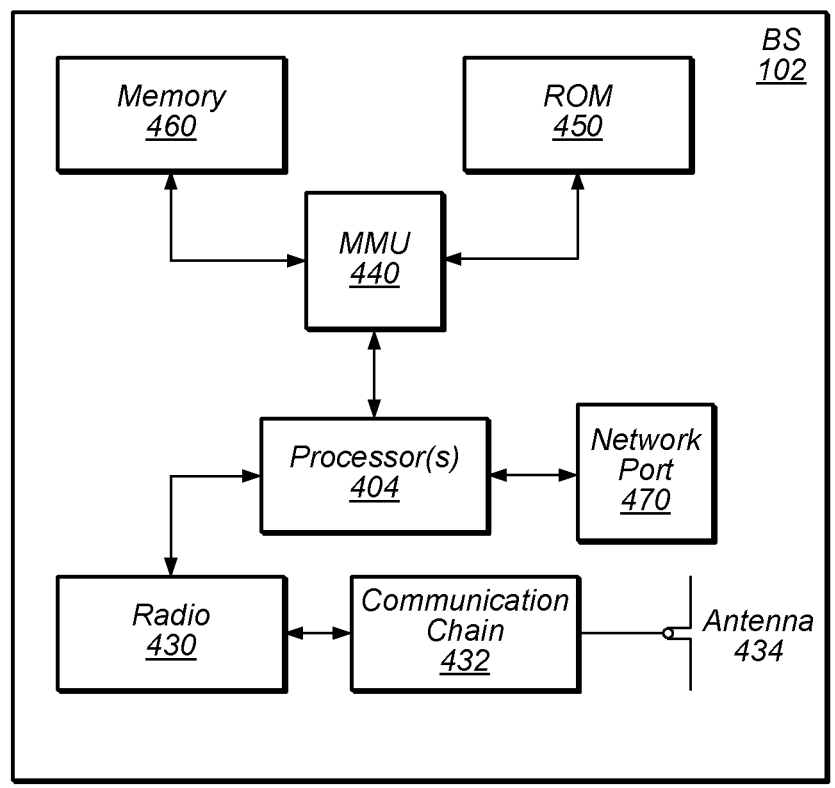
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
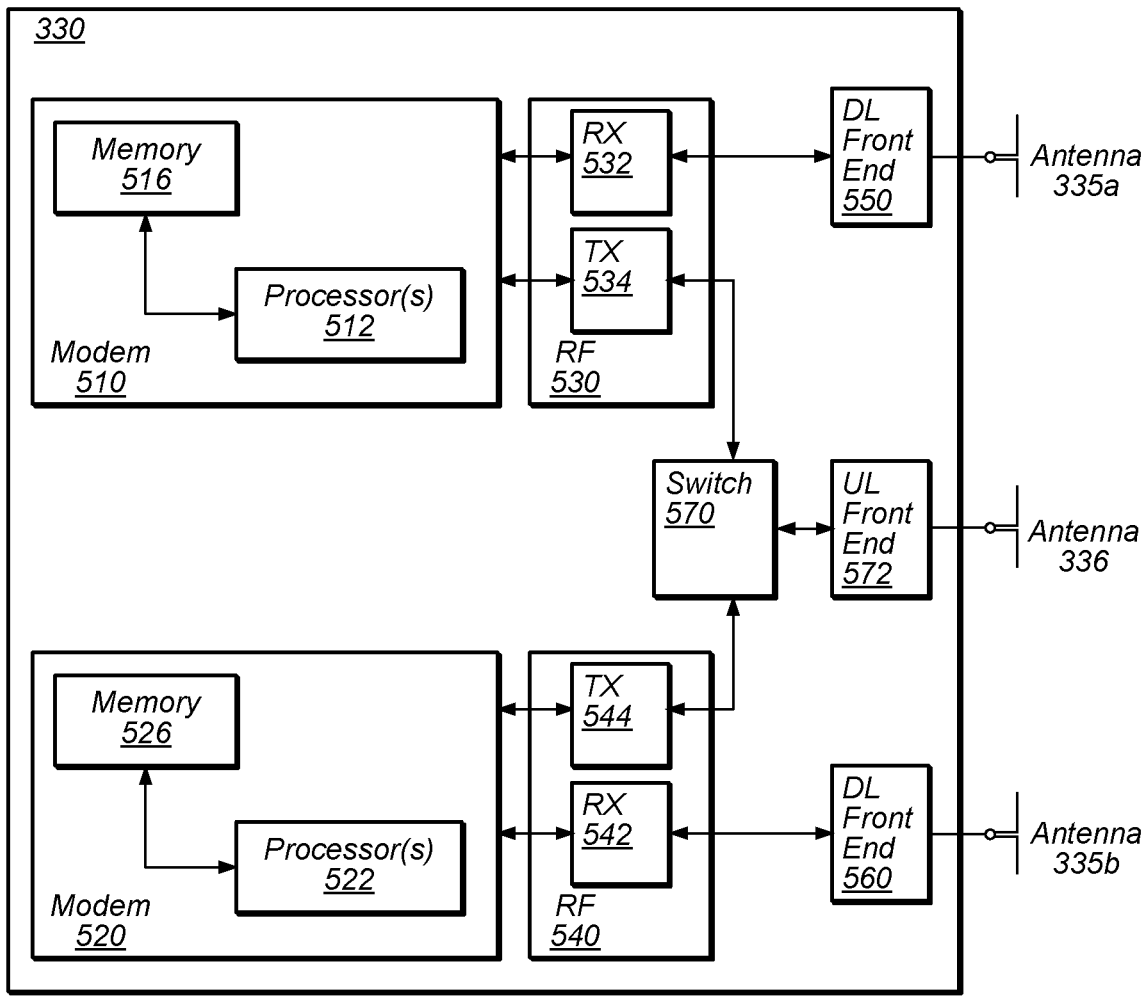
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing features for determining a dual connectivity configuration for a wireless device based on its RF capability, as well as the various other techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

Figure 6A:
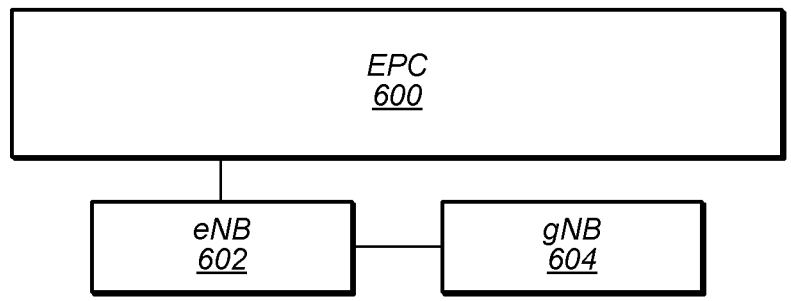
FIG. 6A illustrates an example of connections between an EPC network, an LTE base station (eNB), and a 5G NR base station (gNB), according to some embodiments.
Figure 6B:
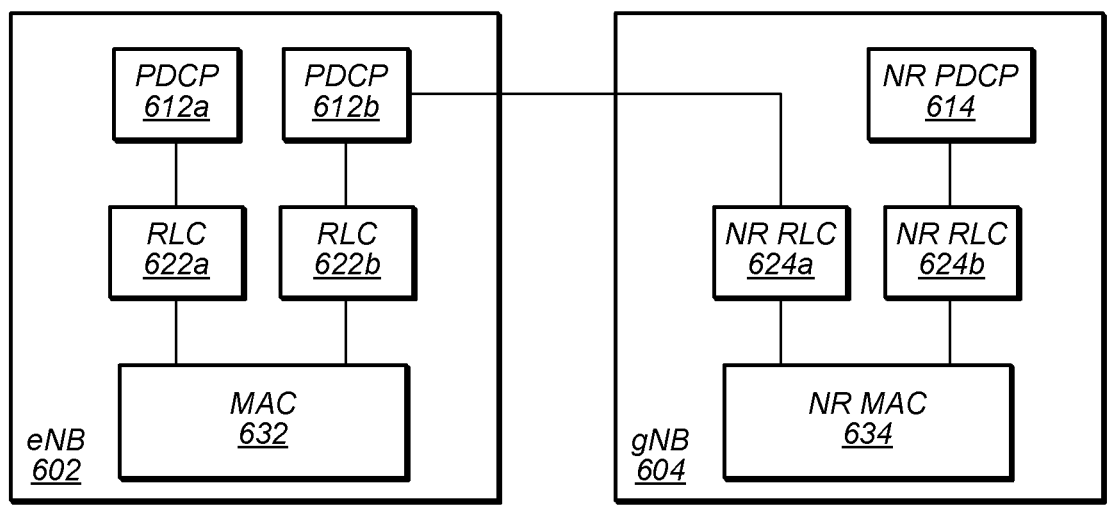
FIG. 6B illustrates an example of a protocol stack for an eNB and a gNB, according to some embodiments.

FIGS. 6A-6B—5G NR Non-Standalone (NSA) Architecture with LTE

In at least some implementations, fifth generation (5G) wireless communication will initially be deployed concurrently with other wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased uplink and/or downlink throughput to UEs. In other words, LTE may be used for control plane signaling and NR may be used for user plane signaling. Thus, LTE may be used to establish connections to the network and NR may be used for data services.

FIG. 6B illustrates a possible protocol stack for eNB 602 and gNB 604, according to some embodiments. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an X2 interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Note that while the illustrated architecture and protocol stack represent possible NSA architecture and protocol stack options, any number of additional or alternative architecture and/or protocol stack options or variations are also possible. For example, as another possibility, a NRC network may be used, with a gNB acting as a master node (MgNB and a eNB acting as a secondary node (SeNB). Numerous other options are also possible.

In general, a non-stand alone (NSA) implementation may employ dual connectivity in both uplink (UL) and downlink (DL). In other words, dual connectivity may require two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a 5th order intermodulation product (IM5) produced at a 5G NR transmitter of the UE from a 2nd harmonic of LTE UL band 3 and NR UL may fall into LTE DL band 7 frequencies during (substantially) simultaneous UL operation. Similarly, a 4th order harmonic of LTE UL band 20 and NR UL transmission may create a 5th order intermodulation product that may interfere with LTE DL band 7 reception and thus desensitize receiving for LTE DL band 7.

In addition, future specifications of NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Thus, having the ability to configure a UE to operate on only one uplink carrier at a time may provide a useful mechanism for resolving intermodulation problems while still allowing a device to maintain a dual connectivity configuration, at least according to some embodiments.

More generally, supporting two sets of radio frequency (RF) hardware in a wireless device may be relatively more expensive that supporting a single set of RF hardware. Dual connectivity configurations that require multiple sets of RF (e.g., for downlink, or for uplink, or for both downlink and uplink) may thus limit or exclude at least some possibilities for designing lower cost/lower end wireless devices capable of supporting dual connectivity.

Accordingly, embodiments described herein (e.g., including the method of FIG. 7 described subsequently herein) define systems, methods, and mechanisms for supporting a dual connectivity cellular communication configuration with a single transmitter wireless device configuration.

Figure 7:
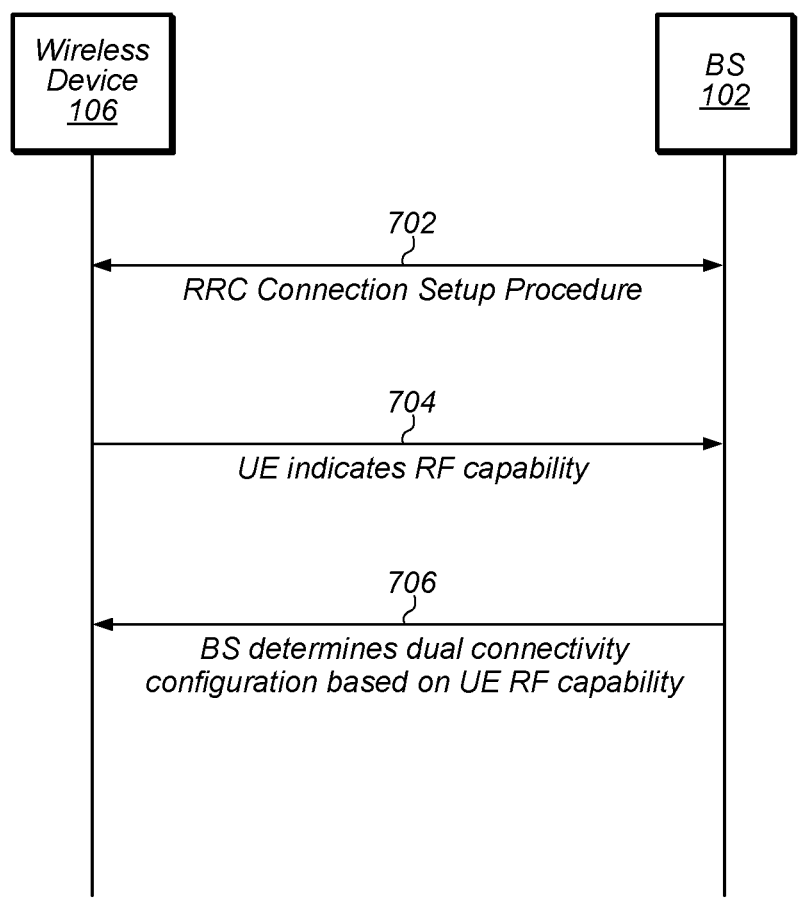
FIG. 7 is a signal flow diagram illustrating an example method for determining dual connectivity configuration for a wireless device based on its RF capability, according to some embodiments.

FIG. 7—Single Transmitter Dual Connectivity Cellular Communication

As previously noted herein, simultaneous dual uplink transmission in separate frequencies can generate intermodulation interference. Such intermodulation can cause downlink sensitivity degradation, e.g., depending on the combination of bands in use for uplink and downlink communication. There are a number of scenarios in which such intermodulation issues may be possible, potentially including several dual connectivity (e.g., LTE-LTE dual connectivity, NR-NR dual connectivity, LTE-NR dual connectivity) and carrier aggregation (e.g., LTE-LTE carrier aggregation, NR-NR carrier aggregation) scenarios.

As further previously noted, at least in some instances, simultaneous dual uplink transmission in separate frequency bands may require a wireless device to be configured with multiple transmitters. Such a requirement may increase the design and/or materials cost of wireless devices that are capable of supporting such a configuration. However, at least in some instances, it may also be desirable to provide support for lower cost devices, such as those with a single transmitter architecture (and/or more generally those capable of operating with a single transmitter configuration for cellular communication), to perform dual connectivity cellular communication.

Accordingly, it may be desirable, at least in some embodiments, to provide techniques for a wireless device to provide information regarding it's RF capability to a cellular network, and for the dual connectivity configuration (or lack thereof) for the wireless device to be selected based at least in part on its RF capability, potentially including selecting a dual connectivity configuration that can be supported using a single transmitter architecture for a wireless device that indicates that it has a single transmitter architecture. FIG. 7 is a signal flow diagram illustrating an example of such a method, at least according to some embodiments. Aspects of the method of FIG. 7 may be implemented by a wireless device such as a UE 106 illustrated in various of the Figures herein, a base station such as a BS 102 illustrated in various of the Figures herein, and/or more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

At 702, a wireless device 106 and a BS 102 may perform a radio resource control (RRC) connection setup procedure. Note that the BS 102 may be a master base station for the wireless device 106, which may be either a eNB or a gNB, e.g., depending on the network configuration (e.g., LTE network, NR network, NSA network including both eNB and gNB), among various possibilities. Establishing the RRC connection may include configuring various parameters for communication between the wireless device 106 and the BS 102, establishing context information for the wireless device 106, and/or any of various other possible features, e.g., relating to establishing an air interface for the wireless device to perform cellular communication with a cellular network associated with the cellular base station. After establishing the RRC connection, the wireless device may operate in a RRC connected state.

In 704, the wireless device 106 may provide an indication of its RF capability to the BS 102. The indication may be an explicit indication (e.g., a capability indicator specifically configured to indicate the RF capability of the wireless device 106) or an implicit indication, according to various embodiments.

According to some embodiments, as part of the RRC connection setup procedure or at any of various other possible times, the wireless device 106 may provide one or more wireless device capability indications to the BS 102. The wireless device capability indication(s) may include information relating to any of various capabilities (or lack of capabilities) of the wireless device 106. At least according to some embodiments, these wireless device capability indication(s) may include information relating to the RF capability of the UE 106.

For example, provision of an explicit wireless device RF capability indication may occur as part of a RF capability handshake, according to some embodiments. According to various embodiments, RRC signaling and/or one or more MAC control elements (CEs) may be used to provide such an explicit indication. If using RRC signaling, an existing message type may be used (e.g., with an additional field for RF capability reporting), or a new message for reporting RF capability may be used, among various possibilities. Such an explicit RF capability indication may be provided by the wireless device 106 in a manner unprompted by the BS 102, or in response to a RF capability enquiry provided by the base station 102, among various possibilities.

According to various embodiments, such a RF capability indicator may be a 1 bit indicator (e.g., with one possible value indicating that a wireless device has a single transmitter configuration for cellular communication, and the other possible value indicating that the wireless device does not have a single transmitter configuration for cellular communication, or with any of various possible alternative meanings for the possible indicator values), or may be a longer indicator (e.g., having more possible RF capability reporting options), among various possibilities. The base station may respond to the wireless device 106 based on receiving the RF capability indicator for the wireless device 106 with an acknowledgement. Alternatively, e.g., if the base station 102 is not configured to support such an indicator, the base station 102 may not acknowledge the RF capability indicator provided by the wireless device 106, based on which (e.g., based on the RF capability handshake failing/being completed unsuccessfully) the wireless device 106 may be able to determine that the network of the BS 102 does not support UE RF capability reporting (and potentially does not support a single transmitter configuration for dual connectivity cellular communication).

In some embodiments, the wireless device capability indications may include one or more reports regarding possible band combinations that may be supported (and/or unsupported) by the wireless device 106. For example, the wireless device 106 may determine whether certain band combinations are supported by the wireless device 106 (e.g., based on the RF communication capabilities of the wireless device 106, and/or possibly based on one or more other considerations such as the potential intermodulation interference impact of such band combinations), and report information indicative of the UE's capabilities (e.g., which may include positive information indicating supported band combinations and/or negative information indicating unsupported band combinations) to the BS 102. Thus, as another possibility, the wireless device 106 may be able to implicitly indicate information regarding its RF capability, e.g., based on which band combinations are indicated to be supported, and/or based on the manner in which the band combinations are reported.

For example, in some instances, each band combination report may include an LTE uplink band indicator, a LTE downlink band indicator, a NR uplink band indicator, a NR downlink band indicator, and a NR supplementary uplink band indicator. In such a scenario, the wireless device 106 may be able to implicitly indicate that it has a single transmitter configuration by reporting the same frequency band for the NR supplementary uplink band indicator as for the LTE uplink band indicator in each band combination report provided by the wireless device 106. Alternatively, the wireless device 106 may be able to implicitly indicate that it is capable of utilizing a multiple transmitter configuration by reporting different frequency bands for the NR supplementary uplink band indicator as for the LTE uplink band indicator for at least one band combination report provided by the wireless device 106.

Thus, explicitly or implicitly, the wireless device 106 may be able to indicate its RF capability to the BS 102. As noted in the previously provided examples, this may include indicating that the wireless device has a single transmitter configuration, e.g., if the wireless device has a single transmitter configuration, or indicating that the wireless device does not have a single transmitter configuration (e.g., has a multiple transmitter configuration), e.g., if the wireless device does not have a single transmitter configuration. Alternatively or additionally, the wireless device's indication of its RF capability may relate to it's receiver configuration. For example, the indication may include (or an additional indication may be provided regarding) whether the wireless device has a single receiver configuration or does not have a single receiver configuration (e.g., has a multiple receiver configuration). Other ways of indicating RF capability and/or indications of other aspects of RF capability are also possible.

Note that, as used herein, a wireless device may be considered to have a single transmitter configuration for cellular communication if the wireless device is configured to use one RF chain for transmitting cellular communication signals. Similarly, a wireless device may be considered to have a single receiver configuration for cellular communication if the wireless device is configured to use one RF chain for receiving cellular communication signals. Such a configuration may occur as a result of actual hardware limitations (e.g., having only a single RF transmit chain and/or having only a single RF receive chain), and/or based on an operating configuration of the wireless device. For example, if the wireless device has multiple RF chains that could potentially be used for transmitting and/or receiving wireless signals, but is temporarily or permanently configured to use only one RF chain for transmitting cellular communication signals (e.g., such as if the wireless device 106 has one or more RF chains temporarily or permanently reserved for use for communication according to one or more other wireless communication technologies), the wireless device may be considered to have a single transmitter configuration for cellular communication, at least according to some embodiments.

As noted previously herein, in some instances, the wireless device 106 may attempt to perform a RF capability handshake with the BS 102, and the attempted handshake may be unsuccessful, e.g., if the BS 102 is not configured to perform such a handshake and does not acknowledge the RF capability indicator transmitted by the wireless device 106. In such a scenario, the wireless device 106 may determine that the BS 102 does not support a single transmitter configuration for dual connectivity cellular communication. In this case, if the wireless device 106 has a single transmitter configuration for cellular communication, the wireless device 106 may determine not to provide a dual connectivity capability report (e.g., may not provide any band combination reports, among various possible aspects of a dual connectivity capability report) to the first base station, e.g., based at least in part on determining that the RF capability handshake was unsuccessful. This may, for example, help prevent the BS 102 from configuring the wireless device 106 with a dual connectivity configuration that the wireless device 106 would be unable to support, such as a configuration in which multiple uplink carriers are configured in different frequency bands and/or the wireless device 106 might be scheduled to perform uplink transmissions on multiple uplink carriers according to multiple radio access technologies simultaneously.

In 706, the BS 102 may determine a dual connectivity configuration for the wireless device 106, e.g., based at least in part on the wireless device RF capability information provided by the wireless device 106. For example, the BS 102 may consider the reported capability information for the wireless device 106 when determining a band allocation/channel allocation for the wireless device 106, e.g., to accommodate a single transmitter configuration of the wireless device 106 if applicable.

For example, as one possibility, if the wireless device 106 indicates that the wireless device 106 has a single transmitter configuration for cellular communication, the BS may select dual connectivity uplink carriers for the wireless device in a same frequency band (e.g., based at least in part on RF capability information received by the BS 102 indicating the single transmitter RF capability of the wireless device 106). As another possibility, if the wireless device 106 indicates that the wireless device 106 does not have a single transmitter configuration for cellular communication, the BS may select dual connectivity uplink carriers for the wireless device in different frequency bands (e.g., based at least in part on RF capability information received by the BS 102 indicating that the wireless device 106 is not limited to single transmitter RF capability).

Note that in some instances, determining the dual connectivity configuration for the wireless device 106 may include determining to not configure the wireless device 106 to perform dual connectivity cellular communication. For example, if the wireless device 106 did not provide a dual connectivity capability report (e.g., based on an unsuccessful RF capability handshake if the wireless device 106 has a single transmitter configuration for cellular communication), the BS 102 may refrain from configuring the wireless device for dual connectivity. In this case, the wireless device may still be capable of performing cellular communication with the BS 102, e.g., using the RAT according to which the BS 102 operates.

The BS 102 may reconfigure the wireless device 106, e.g., in accordance with the determined dual connectivity configuration. For example, if the wireless device 106 indicates that it has a single transmitter configuration, the wireless device 106 may be reconfigured to communicate using a single uplink carrier at a time, and/or with uplink carriers configured in the same frequency band for both of the dual connectivity RATs, such that the wireless device 106 may be able to support the dual connectivity configuration using a single transmitter configuration. As another example, if the wireless device 106 indicates that it does not have a single transmitter configuration, the wireless device 106 may be reconfigured to communicate using multiple uplink carriers at a time, and/or with uplink carriers configured in different frequency bands for both of the dual connectivity RATs. Alternatively, in some instances (e.g., due to intermodulation interference considerations, and/or for any of various other possible reasons), may be reconfigured to communicate using a single uplink carrier at a time, and/or with uplink carriers configured in the same frequency band for both of the dual connectivity RATs, even if the wireless device 106 indicates that it does not have a single transmitter configuration. The reconfiguration to the determined dual connectivity configuration could be performed using RRC signaling and/or using one or more MAC CEs, among various possibilities.

Once configured for dual connectivity cellular communication, the wireless device 106 may perform dual connectivity cellular communication using the configured carriers. For example, in a scenario in which the wireless device 106 with a single transmitter configuration for cellular communication is configured with dual connectivity uplink carriers in a same frequency band, the wireless device 106 may perform uplink communication using each of the configured carriers in the same frequency band in a time-division multiplexing manner using the single transmitter configuration for cellular communication of the wireless device.

Thus, it may be possible to provide a framework for a wireless device to provide information regarding its RF capabilities to the cellular network to which it is attached, which may potentially facilitate selection of an appropriate dual connectivity configuration for the wireless device, including in scenarios in which the wireless device desires a dual connectivity configuration that can be supported by a single RF transmitter configuration. This may in turn allow for simpler and/or more cost-efficient wireless devices to be able to utilize dual connectivity cellular communication techniques, which may broaden the range of possible use cases for which such dual connectivity cellular communication techniques can meet the needs, at least according to some embodiments.

FIGS. 8-20 and Additional Information

FIGS. 8-20 illustrate further aspects that might be used in conjunction with the method of FIG. 7 if desired. It should be noted, however, that the exemplary details illustrated in and described with respect to FIGS. 8-20 are not intended to be limiting to the disclosure as a whole: numerous variations and alternatives to the details provided herein below are possible and should be considered within the scope of the disclosure.

Figure 8:
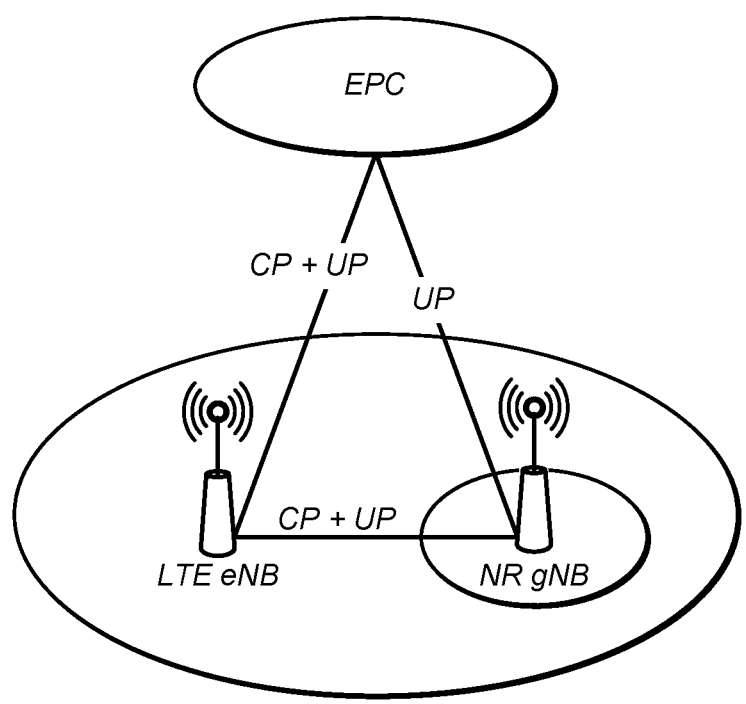
FIG. 8 illustrates an example cellular network arrangement that can support dual connectivity, according to some embodiments.

FIG. 8 illustrates an example portion of a cellular network architecture that may be able to support E-UTRA-NR-Dual-Connectivity (EN-DC) cellular communication, according to some embodiments. As shown, such an architecture may support data flow aggregation across a LTE eNB and a NR gNB via an evolved packet core (EPC). In many instances, dual RF chains and power amplifiers may be expected for UE design to support such techniques. For example, as a default expectation, it may be possible that a UE performing EN-DC communication can support simultaneous dual uplink and dual downlink communication, in different frequency bands. FIG. 9 illustrates an example of such a possible EN-DC resource utilization scheme in which a UE may be scheduled to perform LTE UL communication at a LTE UL frequency during the same time slots as the UE is scheduled to perform NR UL communication at a NR UL frequency.

Figure 10:
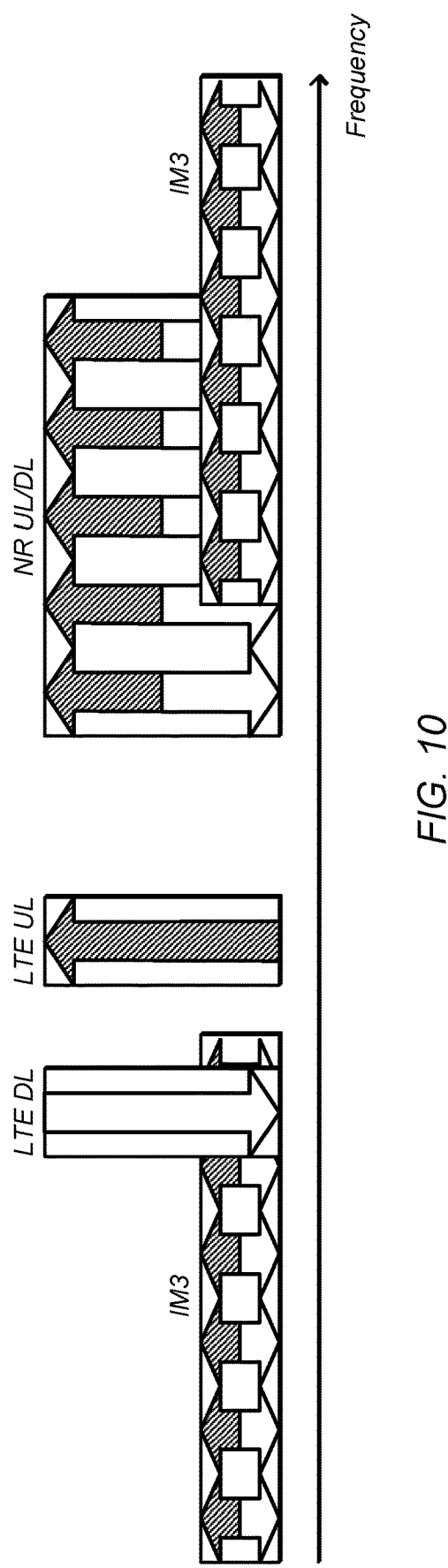
FIG. 10 illustrates an example scenario in which intermodulation interference considerations can impact a dual connectivity arrangement, according to some embodiments.

One possible issue that may occur with simultaneous dual uplink transmission in separate frequencies can include inter-modulation (IMD) interference that may be caused by a UE to its own downlink operations. For example, such inter-modulation interference can cause downlink sensitivity degradation, e.g., depending on the band combination used. Such intermodulation interference scenarios can occur in many scenarios in addition to EN-DC scenarios, e.g., potentially including but not limited to LTE-LTE DC, NR-NR DC, LTE-LTE CA, NR-NR CA, etc. FIG. 10 illustrates one possible example scenario in which third order inter-modulation (IM3) interference may impact LTE DL and/or NR DL operations for a EN-DC UE.

At least according to some embodiments, single uplink transmission techniques may be used to at least partially mitigate/handle such IMD issues; for example, 3GPP Rel. 15 may include at least some techniques for reducing the impact of IMD issues for dual connectivity operation. Such techniques may include utilizing a time-division multiplexing (TDM) uplink transmission timing pattern for sharing a LTE UL carrier and a NR UL carrier between an eNB and a gNB. A UE may be able to indicate to the network that the UE does not support simultaneous UL transmissions, e.g., at least for certain band combinations. For example, band combinations having IM2 and/or IM3 with low-low and/or high-high interference characteristics may be considered 'difficult', as one possibility. HARQ timing for such scenarios can be semi-statically configured using RRC signaling. Simultaneous downlink operation may still be possible; for example, a UE may be able to simultaneously receive signals/channels from both a NR DL carrier and a LTE DL carrier.

Figure 11:
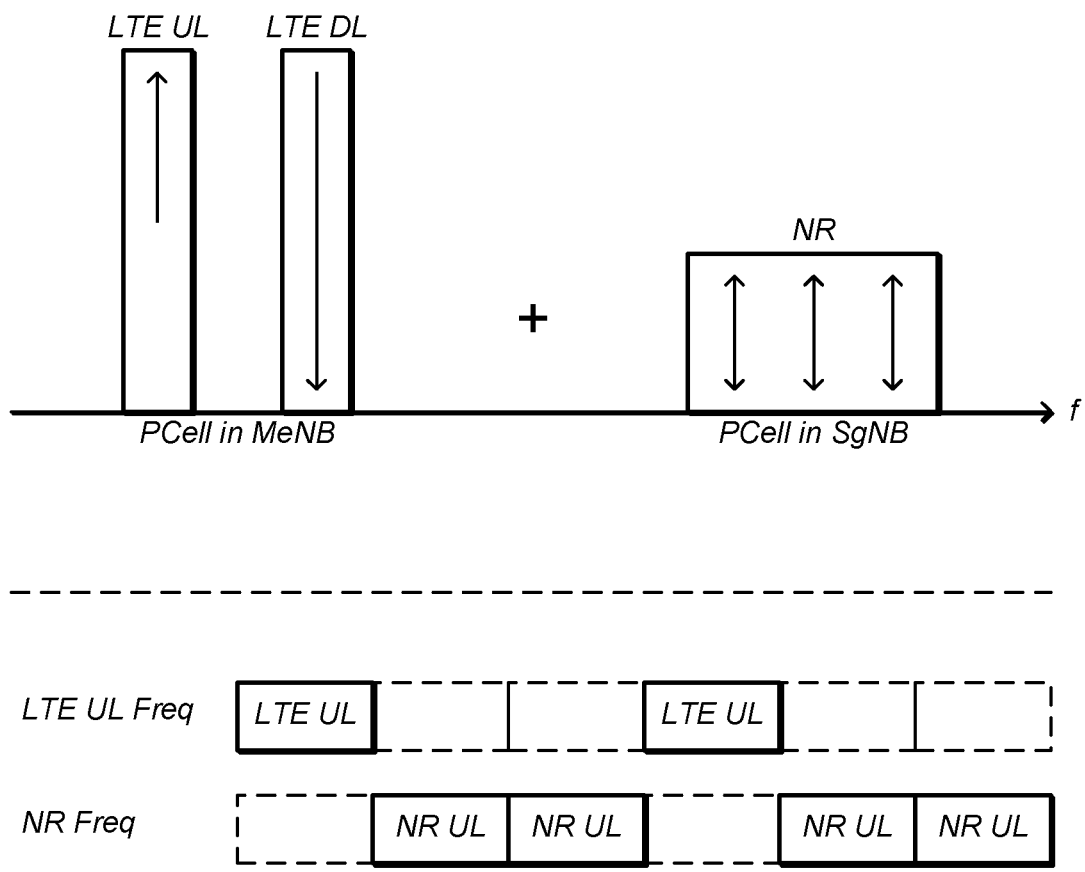
FIG. 11 illustrates an example of a possible dual connectivity resource utilization scheme including intermodulation interference mitigation features, according to some embodiments.

FIG. 11 illustrates an example of a possible EN-DC resource utilization scheme in which a UE may be configured for single uplink transmission, e.g., to avoid possible intermodulation issues from simultaneous uplink transmission in multiple frequency bands, according to some embodiments. As shown, in the example scheme, a UE may be scheduled to perform LTE UL communication at a LTE UL frequency during different time slots as the UE is scheduled to perform NR UL communication at a NR UL frequency, e.g., to help avoid causing intermodulation interference to the downlink operations of the UE.

Figure 12:
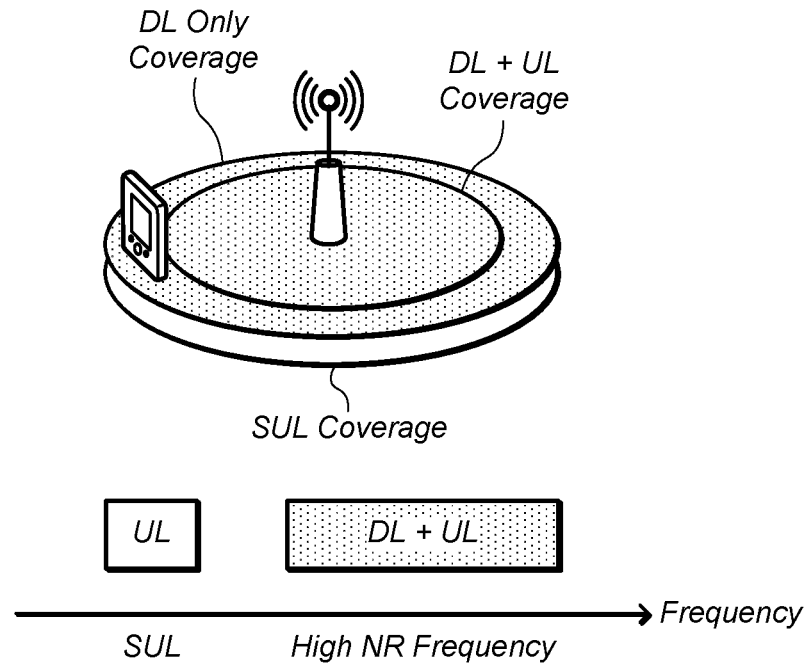
FIG. 12 illustrates an example supplementary uplink scheme for 5G NR communication, according to some embodiments.

FIG. 12 illustrates an example supplementary uplink scheme for 5G NR communication, according to some embodiments. As shown, a UE within communication range of a gNB may be configured for DL and UL coverage on a NR frequency band, and/or may be configured for DL coverage on a NR frequency band without UL coverage on the same frequency band, and also may be configured for UL coverage on a supplementary UL frequency band. A variety of possible configuration scenarios may be possible in relation to the possible use of such a NR supplementary UL carrier, such as including the various scenarios shown in the following table.

TABLE 1

| Case | Normal UL | SUL | SRS |
|---|---|---|---|
| Case 1 | PUCCH + PUSCH, RACH | N/A | SRS is configured if needed either on one |
| Case 2 | N/A | PUCCH + PUSCH, RACH | of the UL carrier or both UL carriers. At |

TABLE 1-continued

| Case | Normal UL | SUL | SRS |
| --- | --- | --- | --- |
| Case 3 | PUCCH + PUSCH, RACH | PUSCH, RACH | least for the UL which would impact the DL carrier MIMO |
| Case 4 | PUSCH, RACH | PUCCH + PUSCH, RACH | |

Figure 13:
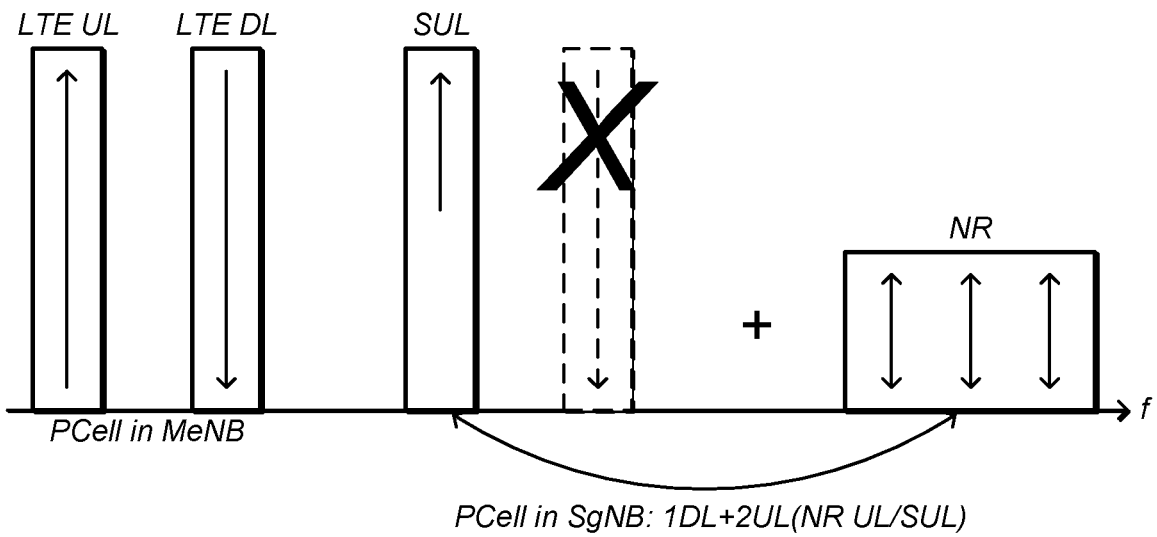
FIG. 13 illustrates an example of a possible dual connectivity resource utilization scheme in which a supplementary uplink carrier is used, according to some embodiments.

FIG. 13 illustrates an example of a possible EN-DC resource utilization scheme in which a NR supplementary UL carrier is used, according to some embodiments. As shown, in the example scheme, in addition to LTE UL and NR UL carriers, a UE may be scheduled to perform NR UL communication at an additional NR SUL carrier frequency.

Figure 14:
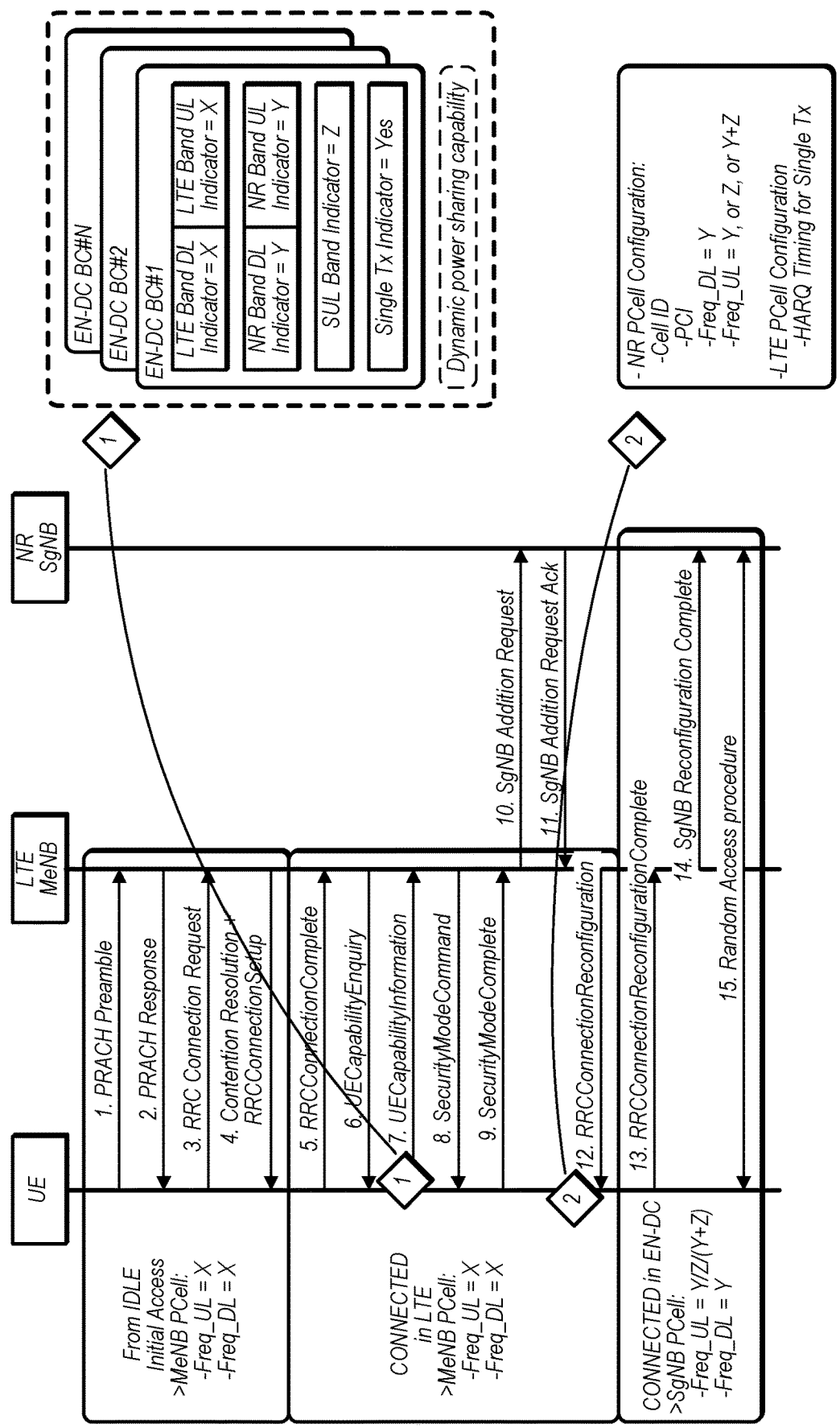
FIG. 14 illustrates an example of a possible dual connectivity configuration workflow, according to some embodiments.

FIG. 14 illustrates an example of a possible EN-DC configuration workflow, according to some embodiments. Such a workflow may be used by a UE to initially establish a RRC connection with a master eNB (MeNB) according to LTE from idle mode, and once connected in LTE, to reconfigure the UE for a EN-DC connection including additionally receiving service from a secondary gNB (SgNB) according to NR.

As shown, the UE may initially perform a RACH procedure with the LTE MeNB, e.g., including transmitting a PRACH preamble (which may also be referred to as a MSG1), receiving a PRACH response (which may also be referred to as a MSG2), transmitting a RRC Connection Request (which may also be referred to as a MSG3), and receiving contention resolution and RRC connection Setup messages (which may also be referred to as a MSG4).

The RACH procedure may establish an RRC connection between the UE and the MeNB. While in connected mode, the UE may provide a RRC Connection Complete message, receive a UE Capability Enquiry, Respond to the UE Capability Enquiry with UE Capability Information, receive a Security Mode Command, and provide a Security Mode Complete message to the LTE MeNB. At least according to some embodiments, the UE Capability Information may include one or more EN-DC band combination (BC) reports (e.g., shown as EN-DC BC #1, EN-DC BC #2, ... , EN-DC BC #N). Each EN-DC BC report may indicator information for each band indicated in the EN-DC BC report, potentially including a LTE DL band indicator, a LTE UL band indicator, a NR DL band indicator, a NR UL band indicator, and a NR SUL band indicator. Each EN-DC BC report may further include a single transmission indicator (e.g., indicating yes if single transmission is requested for the given BC, or no if single transmission is not requested for the given BC). Note that while such an indicator may be used to indicate whether a single transmission configuration is requested (e.g., due to intermodulation considerations), at least according to some embodiments, such an indicator may not be considered to imply or indicate any information regarding the wireless device's Tx configuration. For example, such an indicator could be used by a wireless device that has a multiple transmitter configuration for cellular communication for a band combination that would be expected to cause intermodulation interference to the wireless device, so a base station may not infer that any particular wireless device has a single transmitter configuration for cellular communication solely based on use of a single Tx indicator in a EN-DC BC report. At least in some embodiments, the UE Capability Information may also include an indication of whether the UE has dynamic power sharing capability, e.g., such that it may be capable of dynamically sharing power between RATs (e.g., if scheduled to perform uplink transmissions according to multiple RATs in the same frequency band simultaneously), with appropriate power levels for each, using a single transmitter configuration.

The LTE MeNB may coordinate with the NR SgNB to add the SgNB to a serving set for the UE, e.g., based on the UE Capability Information provided by the UE and/or any of various other possible considerations, e.g., by providing a SgNB addition request to the NR SgNB. The SgNB may confirm by responding with a SgNB Addition Request Acknowledgement.

The LTE MeNB may then provide RRC Connection Reconfiguration information to the UE, e.g., indicating the NR PCell configuration for the UE. As shown, such configuration information may include cell ID information, NR downlink frequency configuration information, and NR uplink frequency configuration information (e.g., which may include the same NR band as configured for NR downlink, a supplementary NR UL band, or both). The UE may also be configured with LTE PCell configuration for HARQ timing, e.g., if the EN-DC configuration is a single TX configuration.

The UE may acknowledge the RRC Connection Reconfiguration with a RRC Connection Reconfiguration Complete message, and the LTE MeNB may provide a SgNB Reconfiguration Complete message to the NR SgNB. The UE and the NR SgNB may then perform a random access procedure to complete the EN-DC configuration, and the UE may subsequently perform EN-DC communication with the LTE MeNB and the NR SgNB.

Although a single transmitter configuration may be possible in some instances using such a workflow, it may still be the case a UE is required to support multiple sets of RF hardware, e.g., as it may not be possible for a UE to reliably avoid being configured for EN-DC in a manner that would require a dual uplink RF configuration. This may not be particularly cost-efficient, however, especially for low end terminals. Accordingly, it may be desirable to provide techniques that can support cost-saving designs, e.g., for low end cellular phones and/or other types of low-cost terminals, among various possibilities.

Figure 15:
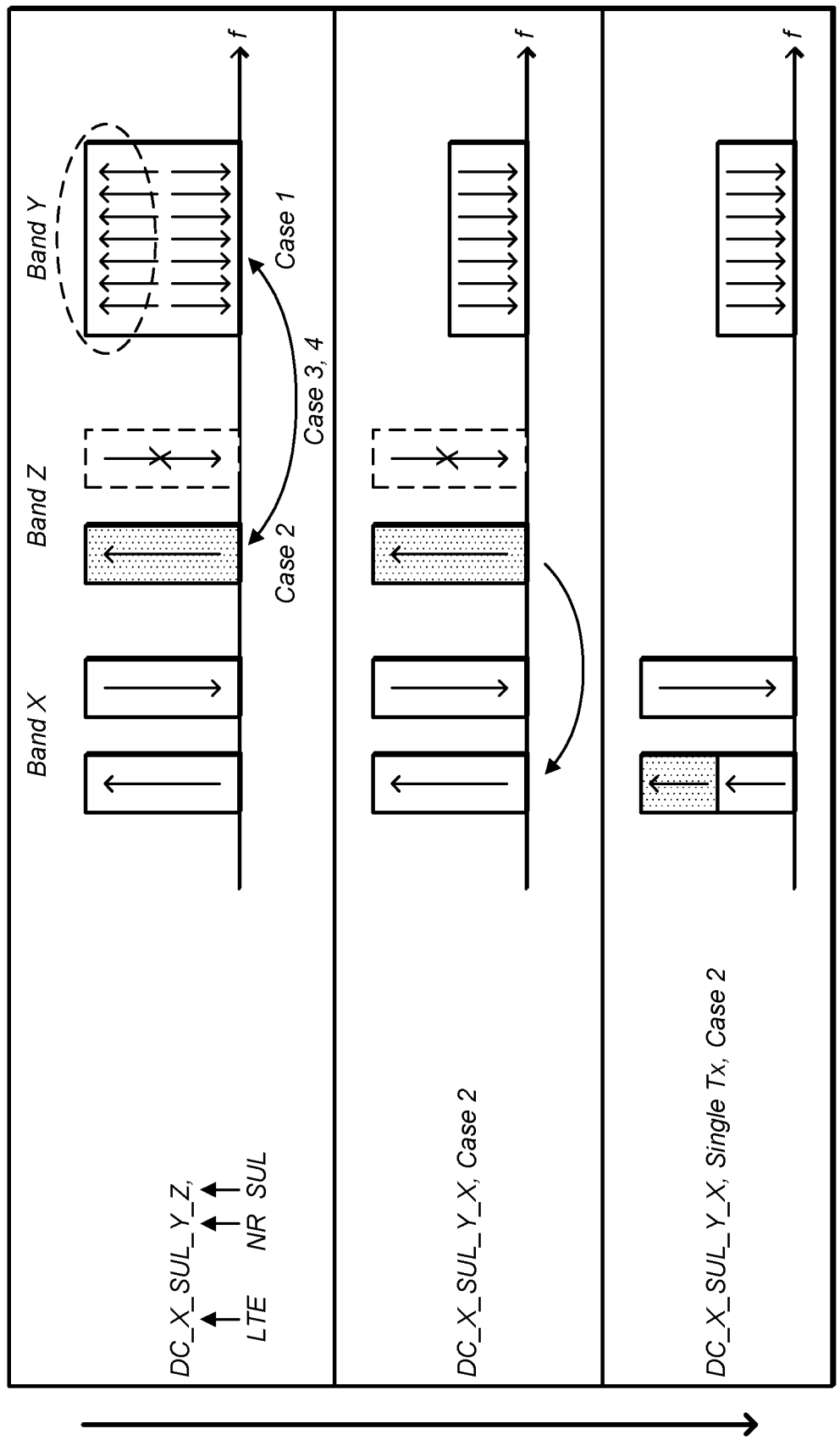
FIG. 15 illustrates various possible dual connectivity configurations, including an arrangement that can be supported by a single transmitter configuration, according to some embodiments.

For example, it may be desirable to determine one or more possible EN-DC resource utilization schemes that can be supported using a single transmitter configuration. FIG. 15 illustrates various possible dual connectivity configurations, including such an arrangement that can be supported by a single transmitter configuration, according to some embodiments.

The uppermost portion of FIG. 15 illustrates a resource utilization scheme in which carriers are configured for LTE UL, NR UL, and NR SUL. Such a scheme may require a multiple transmitter configuration, e.g., particularly if the UL carriers are deployed in different frequency bands and/or are scheduled for simultaneous usage by a UE. The middle portion of FIG. 15 illustrates a resource utilization scheme corresponding to 'Case 2' of the previously provided Table 1, e.g., in which carriers are configured for LTE UL and NR SUL, but no NR UL carrier is configured in the same band as the NR DL carrier. The lowermost portion of FIG. 15 illustrates a variation of such a resource utilization scheme in which in which the NR SUL carrier is configured in the same frequency band as the LTE UL carrier. At least according to some embodiments, a UE having a single transmitter configuration may be able to support such a scheme.

Figure 16:
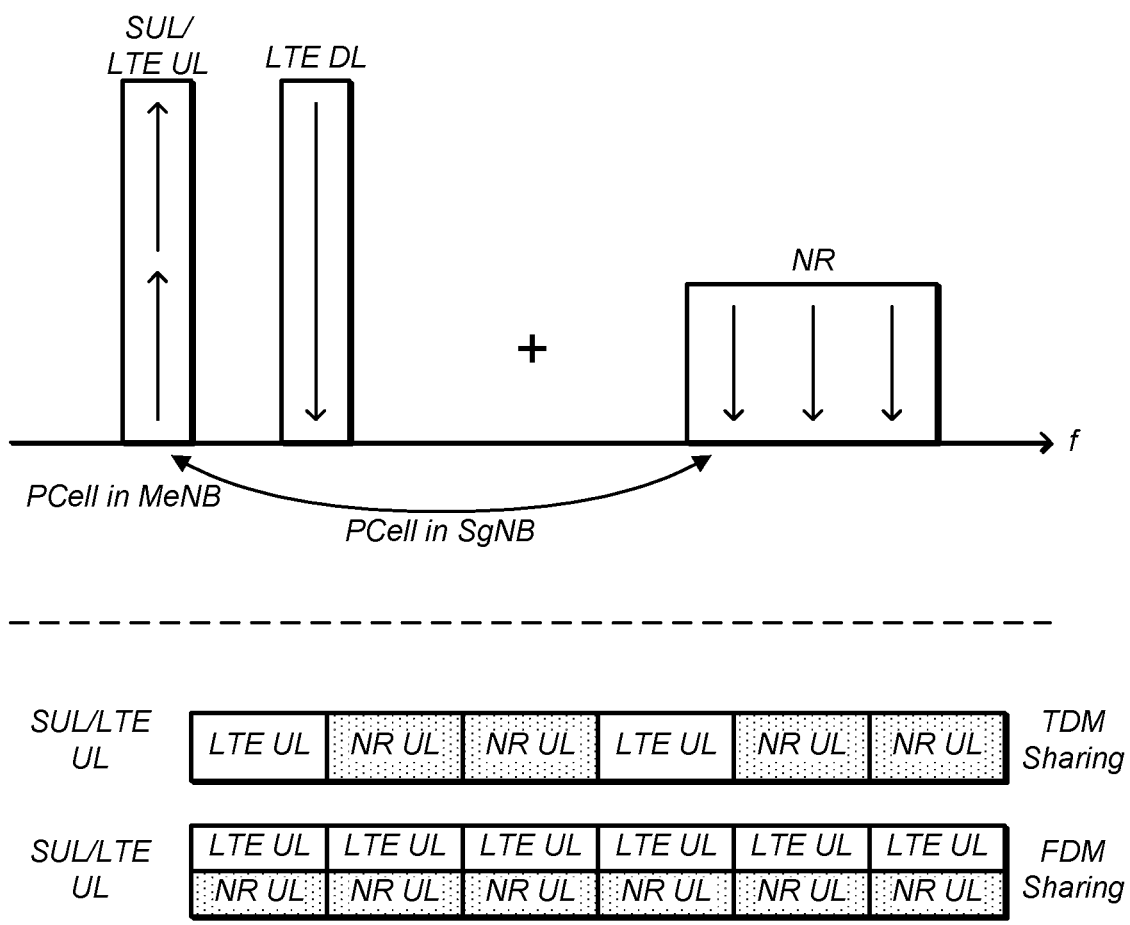
FIG. 16 illustrates an example of a possible dual connectivity resource utilization scheme that can support a single transmitter configuration, according to some embodiments.

FIG. 16 further illustrates such a resource utilization scheme, e.g., including possible scheduling possibilities in such a scheme. As shown, it may be possible to utilize time division multiplexing to schedule the LTE UL carrier and the NR SUL carrier that are deployed within the same frequency band, and/or it may be possible to utilize frequency division multiplexing to schedule the LTE UL carrier and the NR SUL carrier that are deployed within the same frequency band, according to various embodiments.

Thus, it may be possible to configure a EN-DC arrangement for a UE that can be supported using a single transmitter configuration. At least for some such arrangements, the UL frequencies for LTE and NR may be configured in the same band, the LTE cell for the UE may be the normal LTE cell, and the NR cell may include a DL+SUL (e.g., Case 2 in Table 1) arrangement where the SUL carrier is in the LTE band.

It may also be useful to provide a mechanism to allow a UE to communicate that it has a single transmitter configuration (e.g., and thus may need such a configuration if EN-DC is configured for the UE) to its serving cell (e.g., a MeNB, in some instances). There may be multiple possible ways to provide such a mechanism. As one possibility, an implicit indication may be used, for example by having the UE set the SUL band indicator equal to the LTE band indicator for all EN-DC BC reports provided by the UE if it wishes to indicate that it has a single transmitter configuration. As another possibility, an explicit indication may be used, for example by defining a new RF capability indicator that may be used if the UE wishes to indicate that it has a single transmitter configuration.

Figure 17:
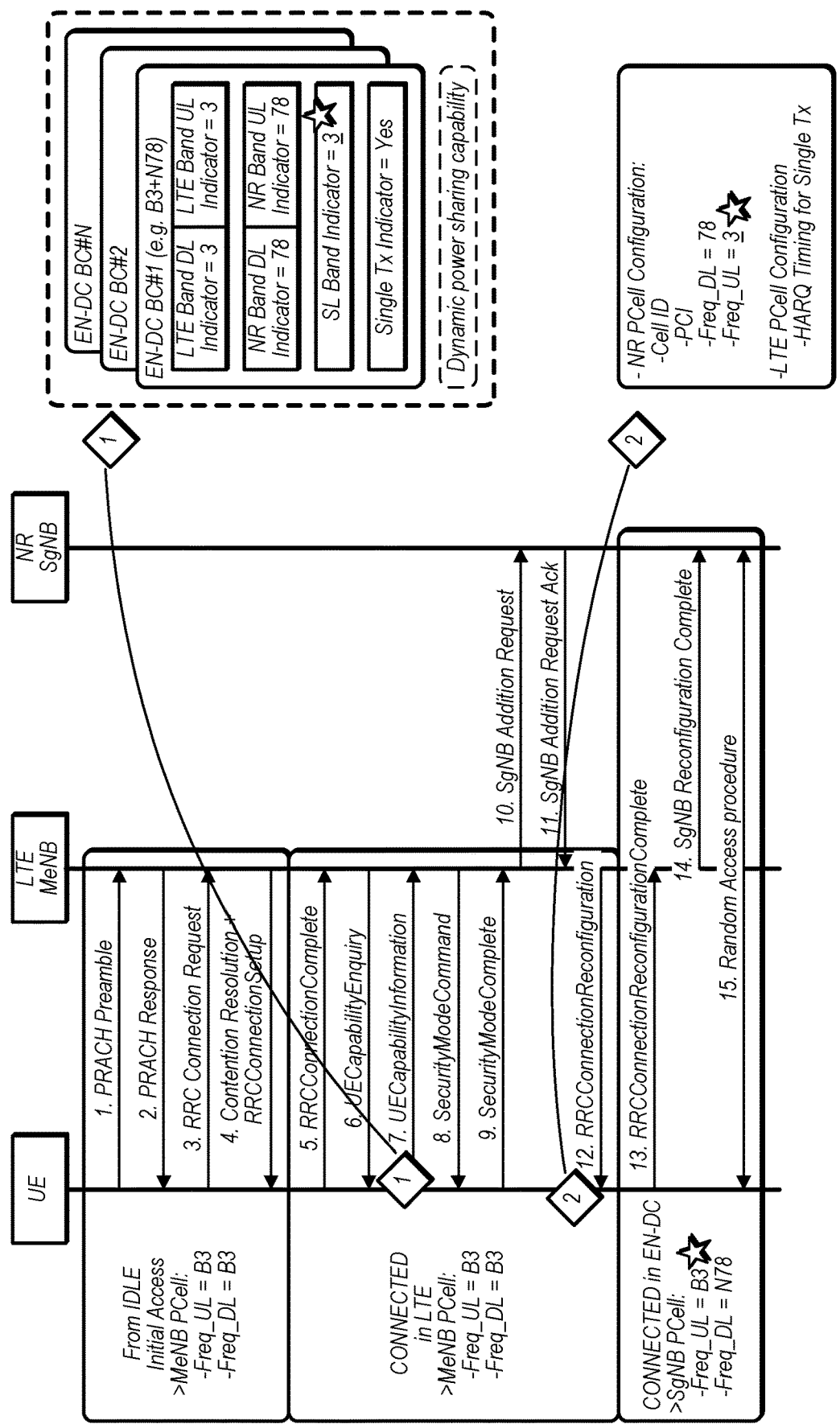
FIG. 17 illustrates an example of a possible dual connectivity configuration workflow in which an implicit indication is used to indicate that a wireless device has a single transmitter configuration, according to some embodiments.

FIG. 17 illustrates an example of a possible EN-DC configuration workflow that may include support for a UE to provide an implicit indication that it has a single transmitter configuration, according to some embodiments.

As shown, the workflow may be substantially similar to the workflow of FIG. 14. However, for each of the EN-DC BC reports, the UE may set the SUL band indicator equal to the LTE UL band indicator, thus implicitly indicating to the LTE MeNB that the UE is has a single transmitter configuration for cellular communication. Based at least in part on this implicit indication, when selecting NR PCell configuration for the UE, the LTE MeNB may select the same frequency band for NR UL as for the LTE UL. Note that such an implicit indication may further be based on any of various other considerations; for example, in some embodiments, setting the SUL band indicator equal to the LTE UL band indicator in combination with including a single Tx indicator set to 'yes' may serve as an implicit indication that the UE is has a single transmitter configuration for cellular communication. As a still further possibility, in some instances, a 'single Tx' indicator may not be used (e.g., may be unnecessary) if the SUL band indicator is set to be equal to the LTE UL band indicator, as this may already implicitly indicate that the UE has a single transmitter configuration for cellular communication.

Figure 18:
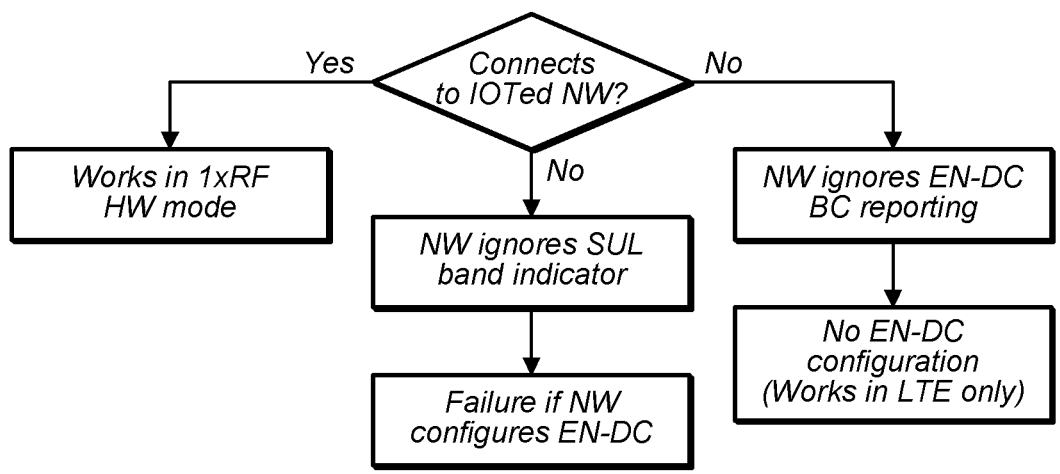
FIG. 18 is a flowchart diagram illustrating possible consequences of a wireless device using an implicit indication to indicate that it has a single transmitter configuration when connecting to a network, according to some embodiments.

Such a technique may work well given sufficient coordination and/or interoperability testing between an infrastructure vendor and a UE vendor, at least according to some embodiments. However, it may also be useful to consider the impact that such techniques may have under other circumstances, such as if a UE with a single transmitter configuration that is configured to utilize such techniques connects to a cellular network that utilizes infrastructure for which interoperability testing has not confirmed support for the techniques. Accordingly, FIG. 18 is a flowchart diagram illustrating possible consequences for various scenarios when a UE with a single transmitter configuration that is configured to utilize such techniques connects to a cellular network.

As shown, if the UE connects to a cellular network with which interoperability testing has been successfully completed, the UE may work in the single transmitter mode, e.g., potentially including being capable of performing EN-DC communication using its single transmitter configuration. If the UE connects to a cellular network with which interoperability testing has not been successfully completed, there may be multiple possibilities and corresponding consequences for how the network may handle the UE's implicit indication of its single transmitter configuration. As one possibility, the network may ignore the SUL band indicator information included by the UE in the EN-DC BC report(s). In this case, if the network attempts to configure EN-DC for the UE, the network may configure the UE with UL carriers in different frequency bands (or may simply schedule the UE in a manner that does not accommodate the single transmitter configuration of the UE), in which case the UE may be unable to perform the EN-DC communication according to the configuration provided by the network. As another possibility, the network may ignore the EN-DC BC reporting by the UE. In this case, the network may simply not attempt to configure EN-DC for the UE, in which case the UE may be able to perform communication with the network, but in a LTE only mode.

Figure 19:
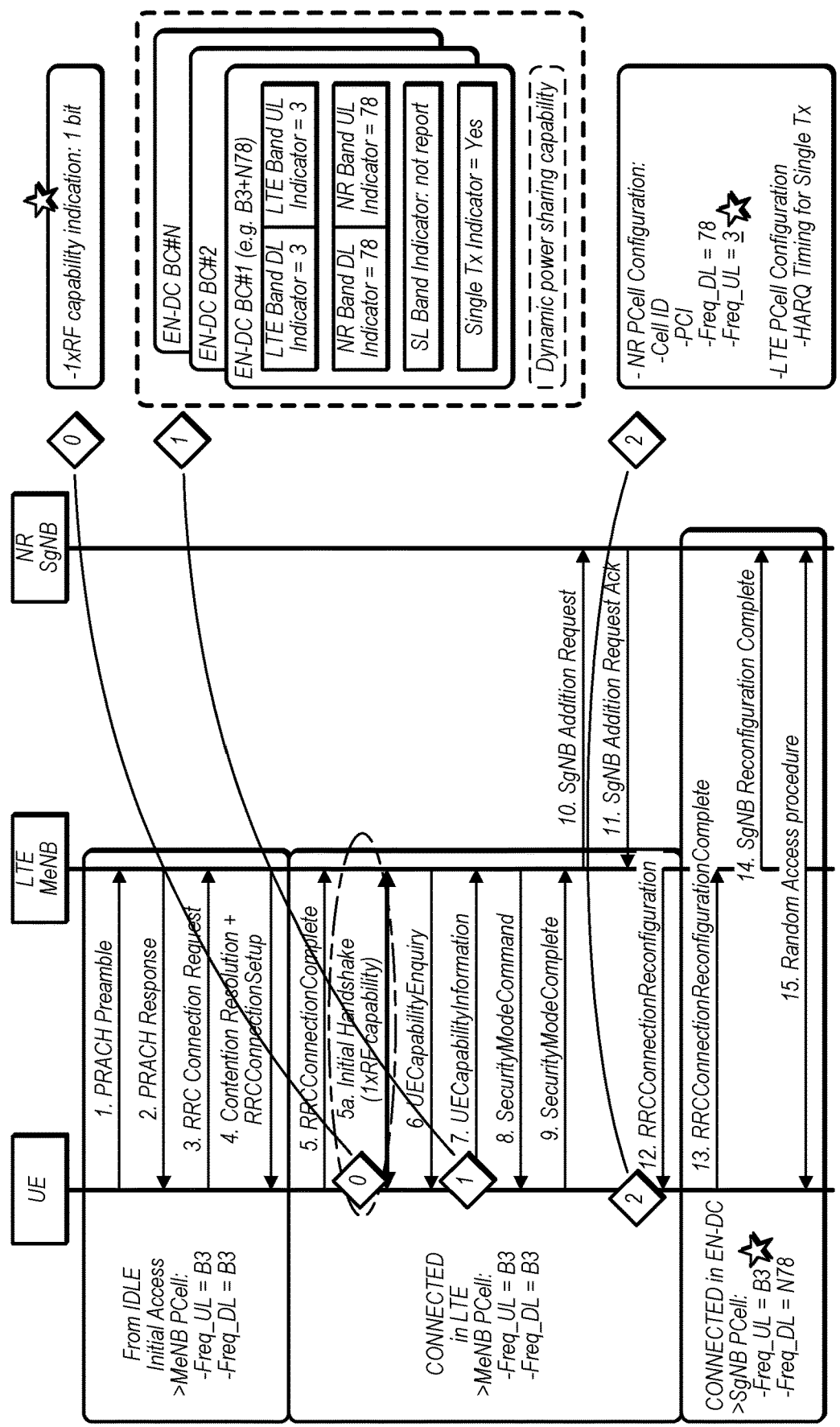
FIG. 19 illustrates an example of a possible dual connectivity configuration workflow in which an explicit indication is used to indicate that a wireless device has a single transmitter configuration, according to some embodiments.

FIG. 19 illustrates an example of a possible EN-DC configuration workflow that may include support for a UE to provide an explicit indication that it has a single transmitter configuration, according to some embodiments.

As shown, the workflow may be substantially similar to the workflow of FIG. 14. However, an additional handshake may be performed to provide the UE with the opportunity to indicate its RF capability information. The RF capability indication may be a 1 bit indicator, as shown, as one possibility. If desired, the UE may account for the possibility that the MeNB does not support use of such a handshake procedure to indicate that the UE has a single transmitter configuration by choosing not to provide any EN-DC capability reporting (e.g., even in response to a UE capability enquiry requesting such information). This may help avoid the possibility that the UE would be configured by the network for a EN-DC configuration that the UE would be unable to support, e.g., due to its single transmitter configuration for cellular communication.

Note that in such a scenario, for each of the EN-DC BC reports, the UE may leave the SUL band indicator blank (e.g., as shown), or may set the SUL band indicator equal to the LTE UL band indicator, or may handle the SUL band indicator in any other desired manner, e.g., as in such a case the MeNB may be able to determine that the applicable SUL band indicator is the same as the LTE UL band indicator due to the previously provided explicit indication that the UE has a single transmitter configuration. As shown, when selecting NR PCell configuration for the UE, the LTE MeNB may subsequently select the same frequency band for NR UL as for the LTE UL (e.g., based at least in part on the explicit indication).

Figure 20:
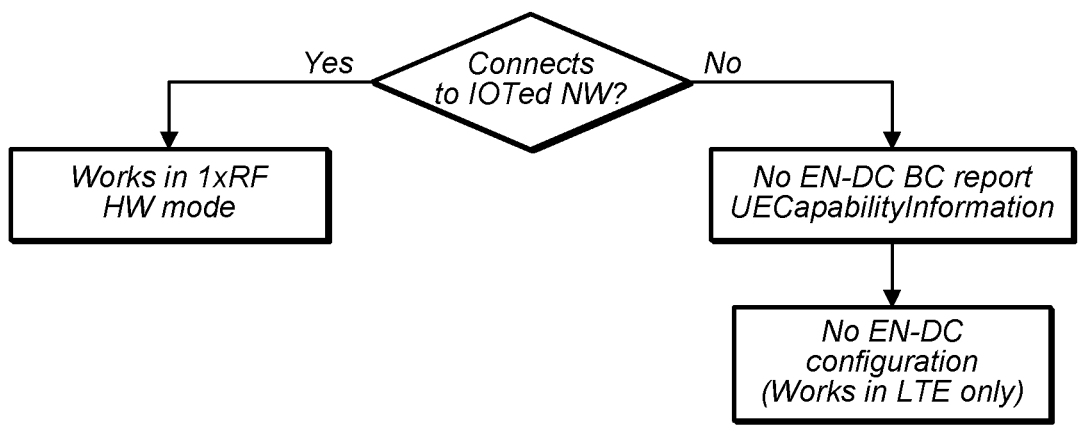
FIG. 20 is a flowchart diagram illustrating possible consequences of a wireless device using an explicit indication to indicate that it has a single transmitter configuration when connecting to a network, according to some embodiments.

Similar to techniques that utilize an implicit indication, it may also be useful to consider the impact that such techniques may have under a variety of circumstances, such as if a UE with a single transmitter configuration that is configured to utilize such techniques connects to a cellular network that utilizes infrastructure for which interoperability testing has not confirmed support for the techniques. Accordingly, FIG. 20 is a flowchart diagram illustrating possible consequences for various scenarios when a UE with a single transmitter configuration that is configured to utilize such techniques connects to a cellular network.

As shown, if the UE connects to a cellular network with which interoperability testing has been successfully completed, the UE may work in the single transmitter mode, e.g., potentially including being capable of performing EN-DC communication using its single transmitter configuration. If the UE connects to a cellular network with which interoperability testing has not been successfully completed, as previously noted, the UE may refrain from providing any EN-DC BC reports when providing UECapabilityInformation for the UE. In this case, the network may not attempt to configure EN-DC for the UE, in which case the UE may be able to perform communication with the network, but in a LTE only mode.

In the following further exemplary embodiments are provided.

One set of embodiments may include an apparatus, comprising a processing element configured to cause a wireless device to: establish a radio resource control (RRC) connection with a first base station according to a first radio access technology (RAT); and provide an indication of radio frequency (RF) capability information for the wireless device to the first base station, wherein a dual connectivity cellular communication configuration for the wireless device is determined based at least in part on the indication of the RF capability information for the wireless device.

According to some embodiments, the indication of RF capability information for the wireless device comprises an indication that the wireless device has a single transmitter configuration for cellular communication, wherein the dual connectivity cellular communication configuration comprises dual connectivity uplink carriers in a same frequency band being configured for the wireless device.

According to some embodiments, the processing element is further configured to cause the wireless device to: perform dual connectivity cellular communication using the configured uplink carriers in the same frequency band in a time-division multiplexing manner using the single transmitter configuration for cellular communication of the wireless device.

According to some embodiments, the indication of RF capability information for the wireless device comprises an indication that the wireless device does not have a single transmitter configuration for cellular communication, wherein the dual connectivity cellular communication configuration comprises dual connectivity uplink carriers in different frequency bands being configured for the wireless device.

According to some embodiments, the indication of RF capability information for the wireless device comprises an explicit capability indication, wherein the processing element is further configured to cause the wireless device to: receive an acknowledgement of the indication of RF capability information from the first base station.

According to some embodiments, the indication of RF capability information for the wireless device comprises an explicit capability indication that the wireless device has a single transmitter configuration for cellular communication, wherein the processing element is further configured to cause the wireless device to: determine that no acknowledgement of the indication of RF capability information is received from the first base station; receive a wireless device capability enquiry from the first base station; and determine to not provide a dual connectivity capability report to the first base station based at least in part on determining that no acknowledgement of the indication of RF capability information is received from the first base station.

According to some embodiments, the indication of RF capability information for the wireless device is provided in response to a RF capability enquiry from the first base station.

According to some embodiments, the indication of RF capability information comprises an implicit indication based at least in part on band indicators indicated by the wireless device in a dual connectivity band combination report.

According to some embodiments, the first RAT comprises long term evolution (LTE), wherein the dual connectivity cellular communication configuration comprises a configuration according to which the wireless device communicates according to both LTE and fifth generation (5G) new radio (NR).

Another set of embodiments may include an apparatus, comprising a processing element configured to cause a cellular base station to: receive an indication of radio frequency (RF) capability information for a wireless device; and configure the wireless device for dual connectivity cellular communication, wherein an uplink band combination for the dual connectivity cellular communication for the wireless device is selected based at least in part on the indication of RF capability information for the wireless device.

According to some embodiments, to configure the wireless device for dual connectivity cellular communication, the processing element is further configured to cause the cellular base station to: configure uplink and downlink carriers for long term evolution (LTE) communication and uplink and downlink carriers for fifth generation (5G) new radio (NR) communication for the wireless device.

According to some embodiments, the processing element is further configured to cause the cellular base station to: select dual connectivity uplink carriers for the wireless device in a same frequency band based at least in part on the RF capability information indicating that the wireless device has a single transmitter configuration for cellular communication.

According to some embodiments, the processing element is further configured to cause the cellular base station to: select dual connectivity uplink carriers for the wireless device in different frequency bands based at least in part on the RF capability information indicating that the wireless device does not have a single transmitter configuration for cellular communication.

According to some embodiments, the indication of RF capability information for the wireless device comprises an explicit capability indication.

According to some embodiments, the processing element is further configured to cause the cellular base station to: transmit an acknowledgement to the wireless device in response to the explicit capability indication of the RF capability information for the wireless device.

According to some embodiments, the indication of RF capability information for the wireless device comprises an implicit capability indication.

Yet another set of embodiments may include a base station, comprising: an antenna; a radio coupled to the antenna; and a processing element coupled to the radio; wherein the base station is configured to: establish a radio resource control (RRC) connection with a wireless device according to a first radio access technology (RAT); receive an indication that the wireless device has a single transmitter configuration for cellular communication from the wireless device; and configure the wireless device for dual connectivity cellular communication according to the first RAT and according to a second RAT, comprising selecting a same uplink band for the wireless device for the first RAT and for the second RAT based at least in part on the indication that the wireless device has a single transmitter configuration for cellular communication.

According to some embodiments, the base station is further configured to: transmit a transmitter capability enquiry to the wireless device, wherein the indication that the wireless device has a single transmitter configuration for cellular communication comprises an explicit capability indication received in response to the transmitter capability enquiry.

According to some embodiments, the base station is further configured to: transmit an acknowledgement in response to the indication that the wireless device has a single transmitter configuration for cellular communication.

According to some embodiments, the base station is further configured to: transmit a wireless device capability enquiry to the wireless device; receive one or more dual connectivity band combination reports from the wireless device in response to the wireless device capability enquiry, wherein a same frequency band is indicated for a supplementary uplink band for the second RAT as for an uplink band for the first RAT in each dual connectivity band combination report, and determine that the wireless device is implicitly indicating that the wireless device has a single transmitter configuration for cellular communication based at least in part on the wireless device indicating the same frequency band for the supplementary uplink band for the second RAT as for the uplink band for the first RAT in each dual connectivity band combination report.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processors configured to cause a wireless device to:
establish a radio resource control (RRC) connection with a first base station according to a first radio access technology (RAT); and
provide an indication of radio frequency (RF) capability information for the wireless device to the first base station,
wherein a dual connectivity cellular communication configuration for the wireless device is determined based at least in part on the indication of the RF capability information for the wireless device,
wherein the indication of RF capability information for the wireless device comprises an indication that the wireless device has a single transmitter configuration for cellular communication,
wherein the dual connectivity cellular communication configuration comprises dual connectivity uplink carriers in a same frequency band being configured for the wireless device.

2. The apparatus of claim 1, wherein the one or more processors are further configured to cause the wireless device to:
perform dual connectivity cellular communication using the configured uplink carriers in the same frequency band in a time-division multiplexing manner using the single transmitter configuration for cellular communication of the wireless device.

3. The apparatus of claim 1, wherein the indication of RF capability information for the wireless device comprises an explicit capability indication, wherein the one or more processors are further configured to cause the wireless device to:
receive an acknowledgement of the indication of RF capability information from the first base station.

4. The apparatus of claim 1, wherein the indication of RF capability information for the wireless device comprises an explicit capability indication that the wireless device has the single transmitter configuration for cellular communication, wherein the one or more processors are further configured to cause the wireless device to:

determine that no acknowledgement of the indication of RF capability information is received from the first base station;

receive a wireless device capability enquiry from the first base station; and determine to not provide a dual connectivity capability report to the first base station based at least in part on determining that no acknowledgement of the indication of RF capability information is received from the first base station.

5. The apparatus of claim 1, wherein the indication of RF capability information for the wireless device is provided in response to a RF capability enquiry from the first base station.

6. The apparatus of claim 1, wherein the indication of RF capability information comprises indicating the same frequency band for an uplink band for a second RAT as for the uplink band for the first RAT.

7. The apparatus of claim 6, wherein the first RAT comprises long term evolution (LTE), wherein the dual connectivity cellular communication configuration comprises a configuration according to which the wireless device communicates according to both LTE and the second RAT, wherein the second RAT is fifth generation (5G) new radio (NR).

8. An apparatus, comprising:

one or more processors configured to cause a cellular base station to:

receive an indication of radio frequency (RF) capability information for a wireless device;

configure the wireless device for dual connectivity cellular communication, wherein an uplink band combination for the dual connectivity cellular communication for the wireless device is selected based at least in part on the indication of RF capability information for the wireless device; and select dual connectivity uplink carriers for the wireless device in a same frequency band based at least in part on the RF capability information indicating that the wireless device has a single transmitter configuration for cellular communication.

9. The apparatus of claim 8, wherein to configure the wireless device for dual connectivity cellular communication, the one or more processors are further configured to cause the cellular base station to:

configure uplink and downlink carriers for long term evolution (LTE) communication and uplink and downlink carriers for fifth generation (5G) new radio (NR) communication for the wireless device.

10. The apparatus of claim 8, wherein the indication of RF capability information for the wireless device comprises an explicit capability indication.

11. The apparatus of claim 10, wherein the one or more processors are further configured to cause the cellular base station to:

transmit an acknowledgement to the wireless device in response to the explicit capability indication of the RF capability information for the wireless device.

12. The apparatus of claim 8, wherein the indication of RF capability information for the wireless device comprises indicating the same frequency band for an uplink band for a second RAT as for the uplink band for the first RAT.

13. A base station, comprising:

an antenna;

a radio coupled to the antenna; and one or more processors coupled to the radio;

wherein the base station is configured to:

establish a radio resource control (RRC) connection with a wireless device according to a first radio access technology (RAT);

receive an indication that the wireless device has a single transmitter configuration for cellular communication from the wireless device; and configure the wireless device for dual connectivity cellular communication according to the first RAT and according to a second RAT, comprising selecting a same uplink band for the wireless device for the first RAT and for the second RAT based at least in part on the indication that the wireless device has a single transmitter configuration for cellular communication.

14. The base station of claim 13, wherein the base station is further configured to:

transmit a transmitter capability enquiry to the wireless device, wherein the indication that the wireless device has a single transmitter configuration for cellular communication comprises an explicit capability indication received in response to the transmitter capability enquiry.

15. The base station of claim 13, wherein the base station is further configured to:

transmit an acknowledgement in response to the indication that the wireless device has a single transmitter configuration for cellular communication.

16. The base station of claim 13, wherein the base station is further configured to:

transmit a wireless device capability enquiry to the wireless device;

receive one or more dual connectivity band combination reports from the wireless device in response to the wireless device capability enquiry, wherein a same frequency band is indicated for a supplementary uplink band for the second RAT as for an uplink band for the first RAT in each dual connectivity band combination report, and determine that the wireless device is implicitly indicating that the wireless device has a single transmitter configuration for cellular communication based at least in part on the wireless device indicating the same frequency band for the supplementary uplink band for the second RAT as for the uplink band for the first RAT in each dual connectivity band combination report.

17. The base station of claim 13, wherein the indication of RF capability information for the wireless device comprises indicating the same frequency band for an uplink band for a second RAT as for the uplink band for the first RAT.

18. The base station of claim 13, wherein the indication for the wireless device comprises an explicit capability indication.

19. The base station of claim 18, wherein the base station is further configured to:

transmit an acknowledgement to the wireless device in response to the explicit capability indication for the wireless device.

20. The base station of claim 13, wherein configuring wireless device for dual connectivity includes configuring uplink and downlink carriers for long term evolution (LTE)

communication and uplink and downlink carriers for fifth generation (5G) new radio (NR) communication for the wireless device.

\* \* \* \* \*